United States Patent [19]

Worthen

[11] Patent Number: 4,712,269

[45] Date of Patent: Dec. 15, 1987

[54] VEHICLE ICE SCRAPER HAVING DEFORMABLE BLADE

[76] Inventor: Billie C. Worthen, 362 Oak Tree Ct., Hoffman Estates, Ill. 60194

[21] Appl. No.: 871,681

[22] Filed: Jun. 9, 1986

[51] Int. Cl.$^4$ ................................................ B60S 3/04
[52] U.S. Cl. .................................... 15/236 R; 30/169
[58] Field of Search ..................... 15/105, 111, 236 R, 15/256.5, 256.51; 30/169

[56] References Cited

U.S. PATENT DOCUMENTS

| | | | |
|---|---|---|---|
| 2,485,521 | 10/1949 | Wendt | 15/236 R X |
| 4,164,801 | 8/1979 | Thomas | 15/236 R |
| 4,275,476 | 6/1981 | Hopkins et al. | 15/236 R |
| 4,418,439 | 12/1983 | Porchet | 15/236 R |
| 4,468,831 | 9/1984 | Schneider | 15/236 R |

FOREIGN PATENT DOCUMENTS 2911422  9/1980  Fed. Rep. of Germany .... 15/236 R

Primary Examiner—Edward L. Roberts
Attorney, Agent, or Firm—Edward D. Gilhooly

[57] ABSTRACT

An ice scraper for vehicle windshields and windows having a scraper blade that is deformable to the curvature of the glass. The scraper blade is mounted on a handle structure between which a flexible rubber or similar material is positioned. The scraper blade is provided with one or more relief openings which permit the blade of the scraper to deform upon pressure being applied to the handle by the user. The deformable plastic blade attains greater efficiency of contact between the windshield and the blade for approved results.

6 Claims, 4 Drawing Figures

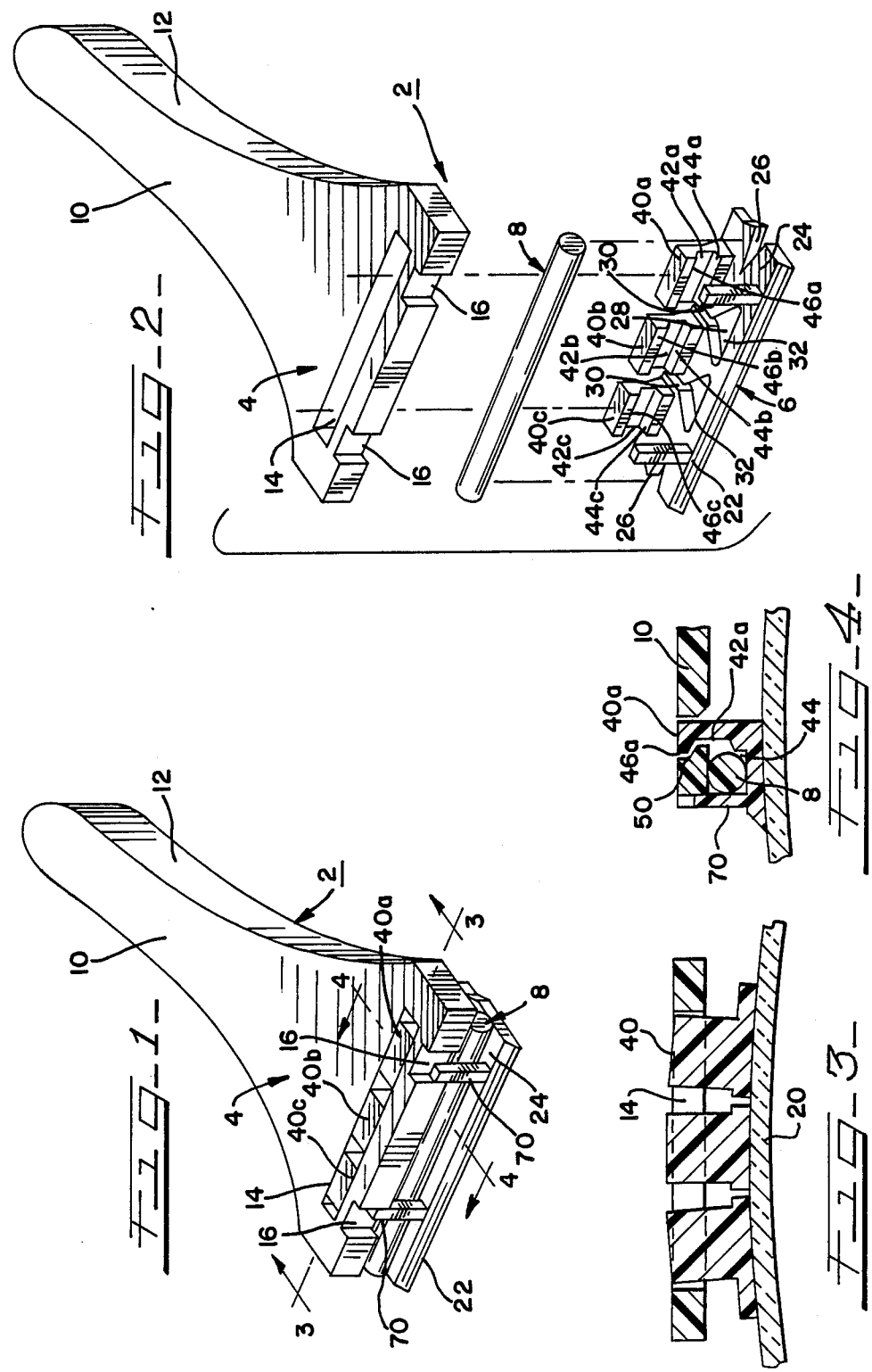

VEHICLE ICE SCRAPER HAVING DEFORMABLE BLADE

BACKGROUND OF THE INVENTION

1. Field of the Invention

This invention relates in general to ice scrapers for vehicle glass and in particular to a ice scraper having a blade that is capable of conforming to the curvature of the glass for improved scraping results.

2. Description of the Prior Art

The removal of a build up of ice from windshields and windows has long been a problem to operators of automobiles, trucks, and other vehicles. Typically, hand-held scrapers of various designs are employed to remove ice accumulation that is common during winter conditions. Known ice scrapers generally include a rigid, straight scraping blade that physically removes the ice from the glass. Such rigid blade structures, however, are highly ineffective when brought into contact with the substantial curvatures of windowshields and other glass areas commonly present in modern vehicles. Because of the rigid blade design, it is virtually impossible for the user to maintain contact between the scraper blade along its entire length and the glass. The use of rigid blade constructions of typical ice scrapers are highly ineffective when used in conjunction with the abrupt curvatures found in many modern automobiles and the like. Accordingly, the need exists for an ice scraper that is capable of removing ice from glass surfaces regardless of the degree of curvature present on the glass surface.

SUMMARY OF THE INVENTION

The present inventions obviates the problems associated with the removal of ice present on windshields of vehicles manufactured with various curvatures. The ice scraper herein disclosed includes a scraper blade that is capable of significant conformance with the curvature of the glass upon which it is pressed.

The foregoing conforming action of the ice scraper of the invention is achieved through a uniquely designed ice scraper structure having a handle and body portion, a unique blade portion, and a rubber member arranged between the body and the blade. The blade portion is formed with relief means through which the scraper edge may conform as it is placed in pressurized contact with the glass surface. The ice scraper of the invention is inexpensive to manufacture and highly effective during use to accomplish the intended result of easy removal of ice during winter conditions and the like.

DESCRIPTION OF THE DRAWING

FIG. 1 is a front perspective view of the vehicle ice scraper having deformable blade of the invention;

FIG. 2 is a front perspective view, with parts shown exploded, of the vehicle ice scraper FIG. 1;

FIG. 3 is a sectional view, taken along lines 3—3 of FIG. 1; and

FIG. 4 is a sectional view, taken along lines 4—4 of FIG. 3.

DETAILED DESCRIPTION OF THE INVENTION

Referring now to FIGS. 1 and 2, there is illustrated the vehicle ice scraper having a deformable blade of the invention, generally designated by reference numeral 2. The ice scraper 2 in general includes a handle and blade mounting body 4 and a scraper blade member 6. The handle body 4 and blade member 6 may be fabricated from a suitably tough material, such as a molded plastic material and the like. A rubber or other resiliant member 8 is imposed between the body portion 4 and the blade member 6 in a manner to be described later.

The body 4 includes a handle 10 having necked down edges 12 to allow it to be manipulated by a user. An elongated slot 14 is formed near the edge of the widened portion of the handle body 10 to receive the blade structure 6 as will be apparent. In addition, a pair of notches 16 are formed on the front edge of the handle 10.

The blade member 6 is arranged to contact a curved window 20 of a windshield or other glass areas of a vehicle and the like as shown in FIG. 3. The glass is contacted by the edge or blade 22 of the blade member 6, which blade will conform to the shape of the glass 20 in a manner to be described. Generally, the blade 22 has a sharpened edge for better scraping results. The blade member 6 further includes a body 24 having triangular notches 26 cut out of the opposite edge portions. A pair of central cut out areas or open slots 30 and interconnecting triangular openings 32 are disposed within the body portion 26.

Three separate members 40$a,b$, and $c$ are integrally formed on the blade body portion 24. A notched area 42$a$ is formed in the mounting block 40$a$, as are notched areas 42$b$ and $c$ similarly arranged in blocks 40$b$ and 40$c$. The blade member 6 forms a space 44 to receive the elongated rubber member 8 as seen in FIG. 4. The notched areas 42$a,b$, and $c$ create a lip 46$a$, 46$b$, and 46$c$, one of which is shown in FIG. 4. The presence of notches 42$a,b$, and $c$ and lips 46$a,b$, and $c$ allows the blade mounting member 6 to snap into position into the elongated slot 14 of the handle 10 to aid in the retention of the blocks 40$a,b$, and $c$ within the slot 14, a sloped portion 50 is formed within the edge of the elongated slot 14 which is best shown in FIG. 4. Each of the blocks 40$a,b$, and $c$ are separated by cut-out areas 30.

Since the slots 30 formed in the blade body 24 open to the edge and meet triangular openings 32, a degree of flexibility is given to the blade edge 22 due to the relief provided by the notches and the separated construction of mounting members 40$a,b$ and $c$ when pressure is applied. Such relief allows the blocks 40$a,b$, and $c$ to flex in an accordian-like fashion as shown in FIG. 3 to permit the blade 22 to conform to the shape of the windshield 20. In FIG. 4 it should be apparent that a small space or clearance is required between the front and back of the blade mounting members 40$a,b$, and $c$ and the edges of the slot 14 to permit movement of the mounting members while undergoing a conforming distortion in response to pressure. The rubber member 8 is interposed beneath the handle portion 10 and against the body portion 24 of the blade member 6 within the cavity 44. The rubber member 8 is retained within its sandwiched position by means of posts 70 which interfit with the notches 16 provided on the edge of the handle portion 10. Accordingly, pressure exerted on the handle 10 causes the edge 22 of the blade structure to conform to the curvature of the windshield in conjunction with the resiliance of the rubber strip 8 and the accordian-like movemen of the blade supports 40$a,b$, and $c$ within the slot 14.

What is claimed is:

1. An ice scraper for the removing of ice from vehicle glass, comprising:

body means having a handle for gripping by a user,
blade means carried by said body means and having a blade member forming a continuous scraper edge along one edge of said blade member, said blade member having a second edge spaced from said one edge, said blade member having at least one cut out section positioned inward from said second edge and opening from said second edge, and said at least one cut-out-section acting to permit said scraper edge to deform in conforming relationship to the curvature of the glass being contacted by said edge upon the application of pressure on said handle.

2. The scraper according to claim 1 wherein said blade member includes a plurality of separate cut-out sections.

3. The scraper according to claim 2 wherein said blade means is mounted in a slot formed in said body means.

4. The scraper according to claim 3 wherein said blade means includes a plurality of spaced mounting members positioned in said slot, said spaced mounting members acting to flex as said scraper edge deforms in conforming relationship to the curvature of the glass.

5. The ice scraper according to claim 4 wherein said cut-out sections are disposed between said mounting members.

6. The ice scraper according to claim 5 further including a resilient member arranged between said body means and said blade means.

* * * * *